(12) United States Patent
Yamashita et al.

(10) Patent No.: US 7,623,314 B2
(45) Date of Patent: Nov. 24, 2009

(54) HEAD CONTROL DEVICE, STORAGE DEVICE, AND CONTACT DETECTION METHOD

(75) Inventors: Satoshi Yamashita, Kawasaki (JP); Shunji Saitoh, Higashine (JP); Yukio Abe, Kawasaki (JP); Shigenori Yanagi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 14 days.

(21) Appl. No.: 11/998,326

(22) Filed: Nov. 29, 2007

(65) Prior Publication Data

US 2008/0218898 A1 Sep. 11, 2008

(30) Foreign Application Priority Data

Jan. 31, 2007 (JP) ............................. 2007-022223

(51) Int. Cl.
G11B 21/02 (2006.01)
G11B 27/36 (2006.01)

(52) U.S. Cl. .......................................... 360/75; 360/31
(58) Field of Classification Search ....................... None
See application file for complete search history.

(56) References Cited

U.S. PATENT DOCUMENTS

| 4,777,544 | A | 10/1988 | Brown et al. |
| 6,563,772 | B2 | 5/2003 | Hong et al. |
| 7,486,459 | B1 * | 2/2009 | Schreck et al. ................ 360/31 |
| 2003/0174430 | A1 | 9/2003 | Takahashi et al. |
| 2005/0024775 | A1 | 2/2005 | Kurita et al. |
| 2006/0119974 | A1 | 6/2006 | Yamazaki et al. |
| 2006/0139789 | A1 | 6/2006 | Yang |
| 2007/0230002 | A1 * | 10/2007 | Kassab ......................... 360/31 |
| 2007/0253092 | A1 * | 11/2007 | Ikai et al. ...................... 360/75 |
| 2007/0268605 | A1 * | 11/2007 | Ryu ............................. 360/31 |
| 2008/0043363 | A1 * | 2/2008 | Yamashita et al. ............ 360/75 |

FOREIGN PATENT DOCUMENTS

| EP | 0 256 356 A2 | 2/1988 |
| EP | 1 677 290 A2 | 7/2006 |
| JP | 2003-272335 | 9/2003 |
| JP | 2006-164388 | 6/2006 |
| JP | 2006-190454 | 7/2006 |
| KR | 2001-0076556 | 8/2001 |
| KR | 2003-0033033 | 4/2003 |
| WO | WO 02/19330 | 3/2002 |

* cited by examiner

Primary Examiner—Andrew L Sniezek
(74) Attorney, Agent, or Firm—Greer, Burns & Crain, Ltd

(57) ABSTRACT

A head control device for controlling, through thermal expansion of a heater, a position of a head for reading and writing data from and to a storage medium, includes a heater control unit that increases a current supplied to the heater stepwise; and an external-force sample retrieving unit that retrieves sampling values of signals each indicating a magnitude of an external force acting on the head in a moving direction of a head support mechanism. The head control device also includes an external-force evaluating unit that calculates a representative value of the sampling values retrieved by the external-force sample retrieving unit to evaluate the magnitude of the external force every time the heater control unit increases the current; and a contact detecting unit that detects contact between the head and the storage medium by comparing each evaluation result by the external-force evaluating unit with a predetermined threshold value.

10 Claims, 11 Drawing Sheets

REPRODUCTION SIGNAL

POSITION ERROR SIGNAL

VCM CURRENT

REPRODUCTION SIGNAL

POSITION ERROR SIGNAL

VCM CURRENT

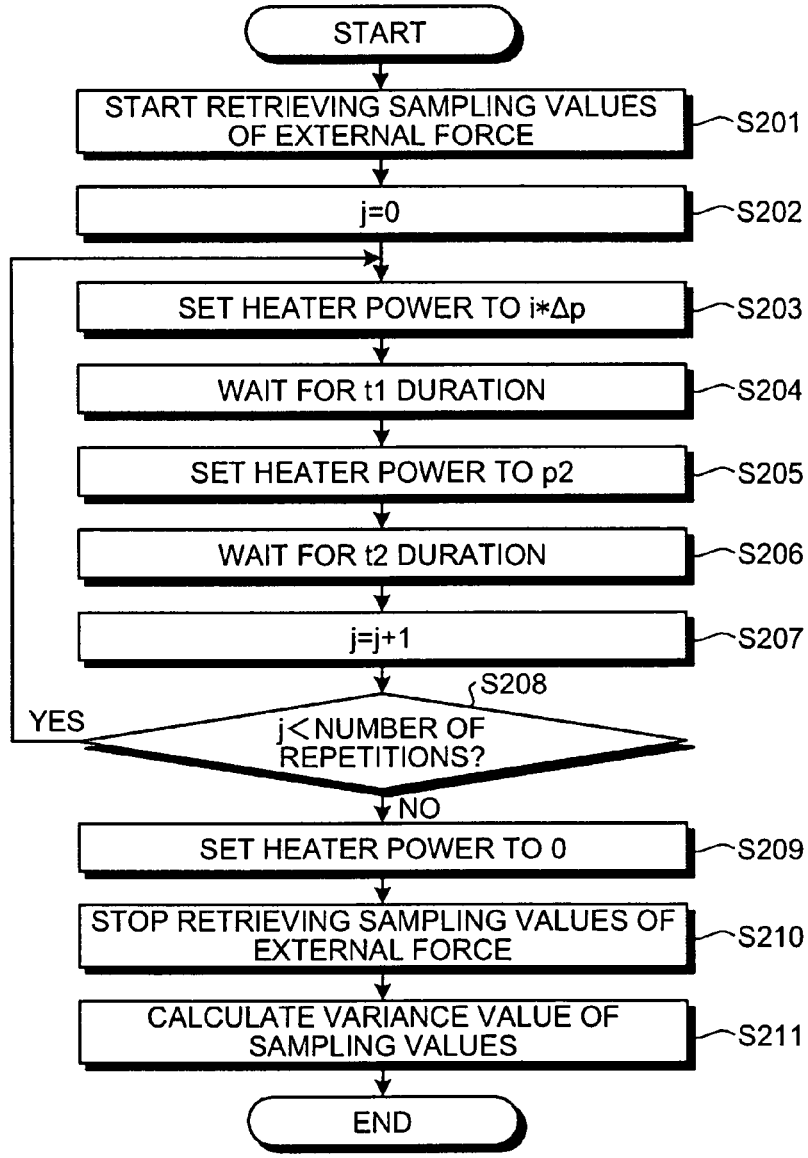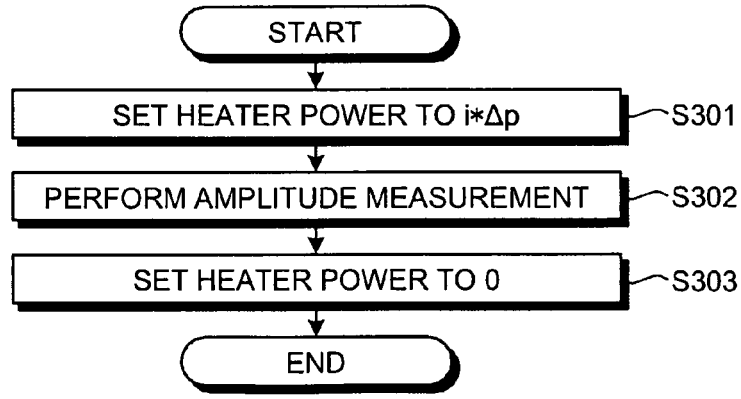

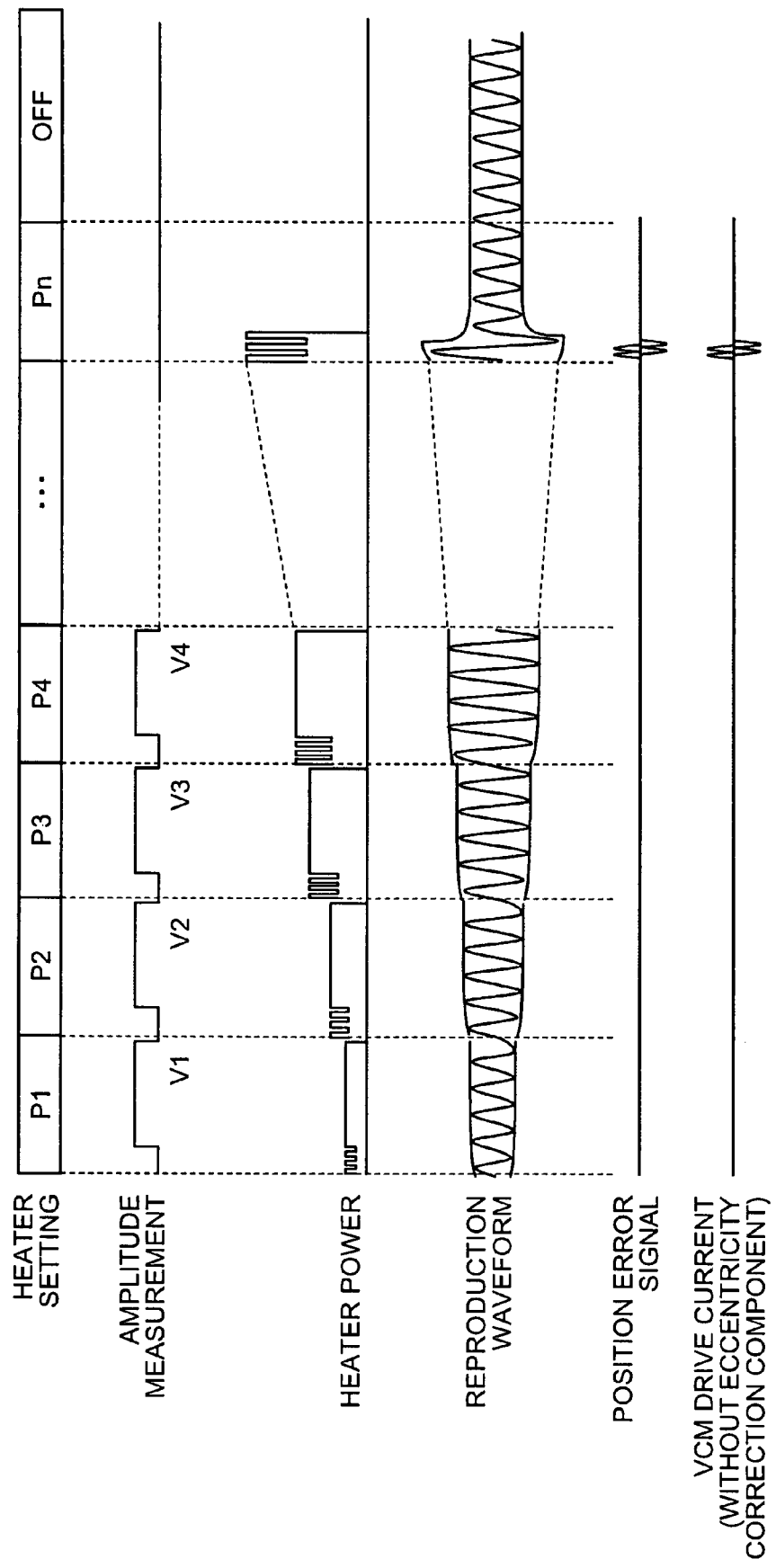

HEAD CONTROL DEVICE, STORAGE DEVICE, AND CONTACT DETECTION METHOD

BACKGROUND OF THE INVENTION

1. Field of the Invention

The present invention relates to a head control device, a storage device, and a contact detection method that enable a head to come in contact with a storage medium with high precision without causing damage to either the head or the storage device.

2. Description of the Related Art

In magnetic disk devices, a technique of dynamically controlling the distance between the surface of the storage medium, such as a magnetic disk, and the head element (more specifically, the magnetic spacing between the end of the head facing the magnetic disk and the storage medium) is well known (for example, Japanese Patent Application Laid-open No. 2003-272335). According to this technique, a heating element is provided in the head to, cause extension of a portion of the head by heat produced by the heating element to thereby bring the head closer to the storage medium, and the distance between the surface of the storage medium and the head is controlled by controlling the heating value. Controlling the distance between the head and the magnetic disk has become all the more important with the substantial jump in the storage capacity of the magnetic disk devices in recent years.

The storage capacity of the magnetic disk device is increased by increasing the recording density of the magnetic disk. When writing/reading data to/from a magnetic disk having high recording density, the head need to be as close to the magnetic disk as possible to heighten its sensitivity to the signals. However, if the head gets too close to the magnetic disk, there is a risk of the head or the magnetic disk or both getting damaged due to contact with each other.

Accordingly, to enable read/write performance of a high-density magnetic disk device, the head has to be precisely controlled so that the head is maintained very close to the magnetic disk and yet does not come in contact with it. A good precision in control of the head is attained by the thermal expansion described earlier.

To maintain a constant distance between the head and the magnetic disk by control by thermal expansion, a standard floating distance between the head and the magnetic disk needs to be determined. The standard floating distance is determined by controlling the magnetic head by thermal heating so that the head slowly approaches and comes in contact with the magnetic disk, and determining the amount of extension when the head comes in contact with the magnetic disk. The amount of extension can be easily determined by determining the amount of electric current supplied to the heater. Thus, to determine the standard floating distance of the head, the amount of electric current that needs to be supplied to the heater to cause the head to come in contact with the magnetic disk needs to be determined. As a premise to determining the standard floating distance of the head, it has to be accurately ascertained that the thermal expansion of the head has caused the head to come in contact with the magnetic disk.

When coming in contact with the magnetic disk, due to jolt from outside, the head may move away from the target track. A technology to address this issue is disclosed in Japanese Patent Application Laid-open No. 2006-190454, whereby the contact of the head with the magnetic disk is detected based on whether a position error signal has exceeded a threshold limit value.

As the head gets closer and closer to the magnetic disk, the amplitude of the signal read by the head increases. In a technology disclosed in U.S. Pat. No. 4,777,544, the amplitude of the signal read by the head is monitored as the head approaches the magnetic disk, and the contact of the head with the magnetic disk is detected based on whether maximum amplitude is attained.

However, in the method of detecting head-disk contact based on the position error signal, in heads that are steady when floating, the variations in the position error signal are insignificant even when head-disk contact happens, making the head-disk contact detection difficult.

In the method of detecting head-disk contact based on attainment of maximum amplitude by the signal, the amount of electric current supplied to the heater needs to be increased for some time even after head-disk contact has taken place, prolonging the head-disk contact duration.

SUMMARY OF THE INVENTION

It is an object of the present invention to at least partially solve the problems in the conventional technology.

According to an aspect of the present invention, a head control device for controlling, through thermal expansion of a heater, a position of a head for reading and writing signals from and to a storage medium, includes a heater control unit that increases a current supplied to the heater stepwise; an external-force sample retrieving unit that retrieves sampling values of signal each indicating a magnitude of an external force acting on the head in a moving direction of a head support mechanism of the head; an external-force evaluating unit that calculates a representative value of the sampling values retrieved by the external-force sample retrieving unit to evaluate the magnitude of the external force every time the heater control unit increases the current; and a contact detecting unit that detects contact between the head and the storage medium by comparing each evaluation result by the external-force evaluating unit with a predetermined threshold value.

According to another aspect of the present invention, a storage device for reading and writing data from and to a storage medium includes a heater that changes a position of a head for reading and writing signals from and to the storage medium by thermal expansion; a heater control unit that increases a current supplied to the heater stepwise; an external-force sample retrieving unit that retrieves sampling values of signal indicating a magnitude of an external force acting on the head in a moving direction of a head support mechanism of the head; an external-force evaluating unit that calculates a representative value of the sampling values retrieved by the external-force sample retrieving unit to evaluate the magnitude of the external force every time the heater control unit increases the current; a contact detecting unit that detects contact between the head and the storage medium by comparing each evaluation result by the external-force evaluating unit with a predetermined threshold value; and a spacing control unit that controls the head to maintain a constant distance between the head and the storage medium based on the current at detection of the contact by the contact detecting unit.

According to still another aspect of the present invention, a contact detection method is for detecting contact between a head and a storage medium. The head is used for reading and writing signals from and to the storage medium, a position of the head is changed by thermal expansion of a heater, and the head and the heater being included in a storage device. The contact detection method includes increasing a current supplied to the heater stepwise; retrieving sampling values of signal each indicating a magnitude of an external force acting on the head in a moving direction of a head support mechanism of the head; calculating a representative value of the sampling values to evaluate the magnitude of the external force every time the current is increased; and detecting contact between the head and the storage medium by comparing each evaluation result of the magnitude of the external force with a predetermined threshold value.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 11 is a flowchart of an external force evaluation process;

FIG. 12 is a flowchart of an amplitude measurement process; and

FIG. 13 is a timechart of contact detection.

DETAILED DESCRIPTION OF THE PREFERRED EMBODIMENTS

Exemplary embodiments of the head control device, the storage device, and the contact detection method according to the present invention are described below with reference to the accompanying drawings. In the embodiments of a head control device, storage device and contact detection method described below, the present invention is applied to a magnetic disk device. The present invention can equally be applied to other storage devices such as thermomagnetic disk devices and magneto-optic disk devices.

Figure 1:
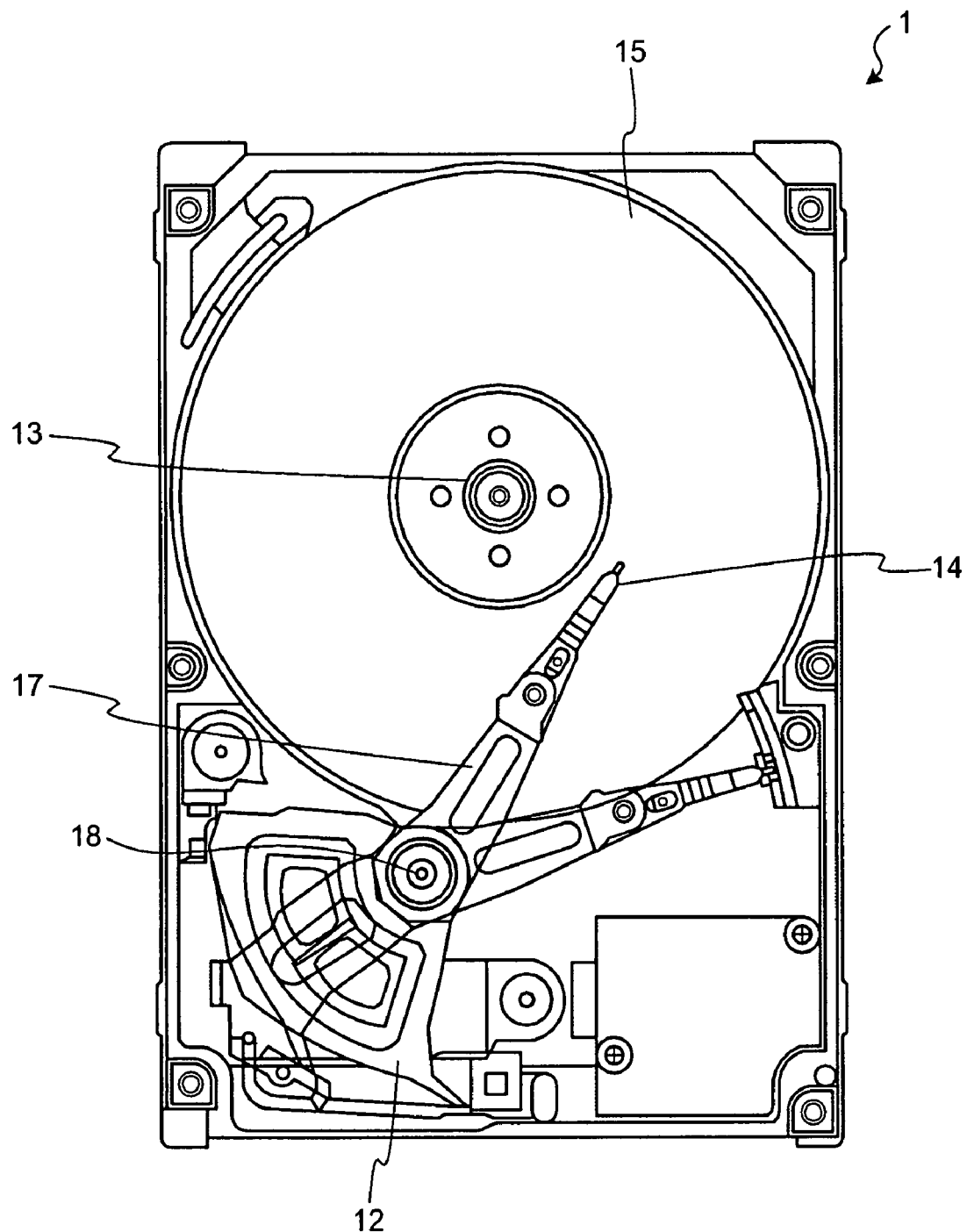
FIG. 1 is a cross-sectional view of a magnetic disk device according to an embodiment of the present invention.

An overview of the contact detection method according to an embodiment of the present invention is explained below. FIG. 1 is a cross-sectional view of a magnetic disk device (or drive) 1 according to the embodiment of the present invention. A magnetic disk 15 is a storage medium for storing various data and is driven to spin by a spindle motor (hereinafter, "SPM") 13.

A head 14 provided at one end of an arm 17, which serves as a head supporting mechanism, reads data from and writes data to the magnetic disk 15. When performing read/write, the head 14 lifts, forming and maintaining a small clearance between itself and the surface of the magnetic disk 15, due to a lifting force produced by the spinning of the magnetic disk 15. A voice coil motor (hereinafter, "VCM") 12, which serves as a head driving mechanism, is provided at the other end of the arm 17, and causes the arm to swing in an arc about a shaft 18 across tracks on the magnetic disk 15 to perform seek operations, and to change read/write target tracks.

Figure 2:
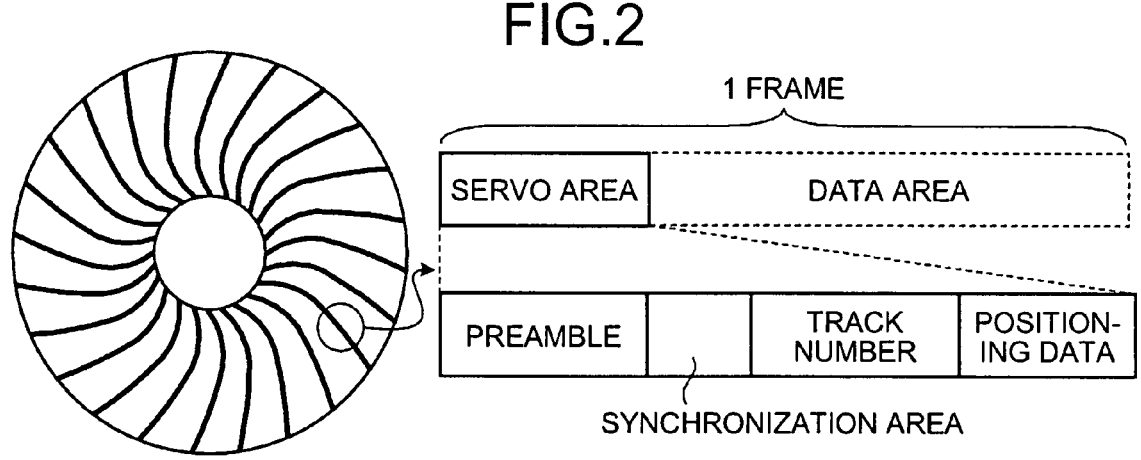
FIG. 2 is a schematic of a magnetic disk.

FIG. 2 is a pattern diagram of the magnetic disk 15. The magnetic disk 15 has a plurality of servo areas aligned along radial lines. The servo area includes a preamble area, a track synchronization area, track number indicating the track at that position, and positioning data for accurately controlling the position of the head 14 in the radial direction.

Figure 3:
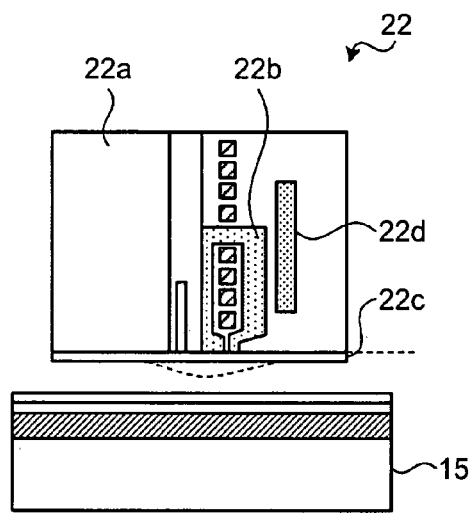
FIG. 3 is a cross-sectional view of a magnetic head.

The head 14 includes a slider (not shown) that lifts up the head 14 and a magnetic head 22 that reads/writes signals. FIG. 3 is a cross-sectional view of the magnetic head 22. The magnetic head 22 includes a reading element 22a that reads data, a recording coil 22b that writes data, and a heater 22d.

The heater 22d changes the shape of the magnetic head 22 by thermal expansion so that an air bearing surface (ABS) 22c bulges towards the magnetic disk 15, causing the reading element 22a and the recording coil 22b to get closer to the magnetic disk 15. The magnetic disk device 1 is configured to set the distance between the magnetic head 22 and the magnetic disk 15 to any value by changing the amount of electric current supplied to the heater 22d.

The magnetic disk 15 is a high-density data storage medium, and requires that the distance between the magnetic head 22 and the magnetic disk 15 be as short as possible so that the sensitivity of the reading element is heightened in order for the data to be read from it accurately. However, if the distance between the magnetic head 22 and the magnetic disk 15 is too short, there is a danger of the magnetic head 22 crashing on the magnetic disk 15, leading to loss of data, disk loss, etc.

Therefore, in the magnetic disk device 1, the amount of electric current (electric power) to be supplied to the heater 22d to cause the magnetic head 22 to come in contact with the magnetic disk 15 (the magnetic head 22 coming in contact with the magnetic disk 15 shall hereinafter be referred to as "touchdown") is determined beforehand, and control is exerted so as to maintain a constant distance between the magnetic head 22 and the magnetic disk 15, taking the amount of electric current that causes the touchdown as a criterion.

To determine the amount of electric current (hereinafter, "heater power") supplied to the heater 22d at touchdown, the magnetic disk device 1 increases the amount of electric current to the heater 22d stepwise, and determines, at each step of increased heater power if touchdown has taken place. Touchdown is detected by measuring an external force added to the magnetic head 22 by causing the magnetic head 22 to go on-track on any recording track or a predetermined test track.

An on-track control (also known as track-following control) is generally performed on a head by causing the head to go on-track and following the track. On-track control is a feedback control in which the positioning data can be read from the track, and also position error signal is obtained through a servo demodulating unit, and head positioning is performed by controlling a VCM driving current through a servo control unit 11 so that there is zero position deviation (target track position-head signal). If the head moves away from the target track (also known as off-track) along the circular locus of the arm 17 about shaft 18 due to an external force such as a shake, the driving current supplied to the VCM is controlled so as to cause the head to return to the target track. In the present invention, the on-track control described above, which is deployed in a common magnetic disk device, is used.

Figure 4A:
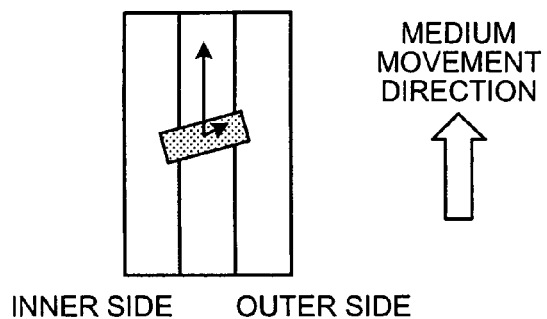
FIG. 4A is a schematic for explaining an external force produced when touchdown occurs when a yaw angle is positive.

FIG. 4A is an explanatory drawing of detection of an external force produced by a touchdown when a yaw angle is positive. Yaw angle refers to the angle that the line joining the magnetic head 22 and the shaft 18 forms with a tangent to the track where the magnetic head 22 is positioned. The yaw angle varies with the radial position of the magnetic head 22 (the yaw angle is positive when on the counter-clockwise side of the tangent to the track).

When a touchdown occurs when the yaw angle is positive, a force is produced in the magnetic head 22 in the direction of disk movement due to friction or impact arising from contact with the disk. However, the magnetic head 22 is capable of moving only in the circular locus about the shaft 18. Therefore, only the component of the force that is in the movable direction of the arm 17 serves as an external force of the movable direction of the arm 17, causing the magnetic head 22 to move in a direction so as to obtain zero yaw angle.

Figure 5A:
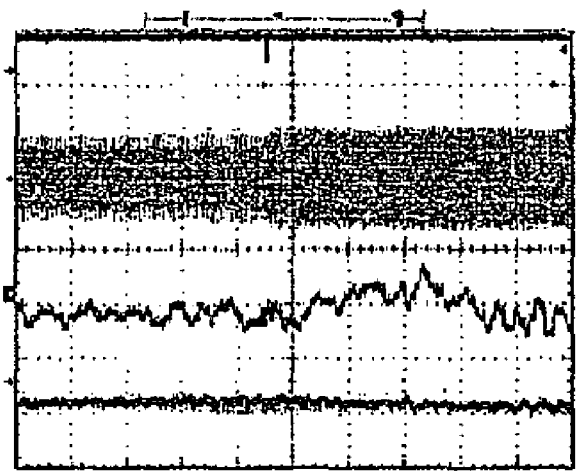
FIG. 5A is a schematic for explaining detection of external force at touchdown.

FIG. 5A is a drawing of signals detected by the magnetic disk device 1 in the situation described above. The reproduction amplitude in FIG. 5A corresponds to the amplitude of the signal when the preamble area of the servo area on the track is read. The amplitude gets larger as the amount of current supplied to the heater 22d is increased stepwise to reduce the distance between the magnetic head 22 and the magnetic disk 15.

The position error signal in FIG. 5A is the signal obtained by reading the positioning data in the servo area and indicates the offset between the current track position of the magnetic head 22 and the target track position. In the example shown in FIG. 5A, the position error signal gets larger as the amplitude of the reproduction signal increases, that is, as the amount of electric current to the heater 22d is increased by one step, indicating that a touchdown has occurred and an external force is acting in the movable direction of the arm 17.

The amount of the VCM current in FIG. 5A represents the intensity of the control signal to be sent to the VCM 12 to correct the position of the magnetic head 22 on the track. In the example shown in FIG. 5A, a condition is shown in which the VCM current is varied after a slight delay after the position error signal gets larger, a touchdown has occurred, and correction of the radial position of the magnetic head 22 is required.

As variations can be seen in the position error signal and VCM current when a touchdown occurs, detection of a touchdown can be made by observing the position error signal and the VCM current. However, these variations are miniscule, they cannot be detected easily.

Therefore, in the contact detection method according to the present embodiment, every time the amount of electric current to the heater 22d is increased, a plurality of sampling values of the position error signal or the VCM current is retrieved, a sampling value distribution is determined at every step, the variance of the sampling values is taken as a representative value and compared with a threshold value to determine whether touchdown has occurred. The variations in the position error signal and the VCM current are made unambiguous by determining a representative value of the sampling values, enabling easy determination of a touchdown.

Specifically, at a step when the amount of electric current supplied to the heater 22d is p, and the position error signal are sampled m times, a representative value s1 can be determined by equation (1):

$$s1 = \sum_{i=1}^{m} \{pes(i, p) - \mu(p)\}^2 \quad (1)$$

where pes(i,p) represents the sampling value of the ith position error signal at the step when the amount of electric current to the heater 22d is p, and $\mu(p)$ represents an average value of the position error signal sampled at that step. In equation (1), the variance of the sampling values of the position error signal has been shown as the representative value. Dispersion of the sampling values of the VCM current can similarly be used as the representative value.

Instead of variance, an integrated absolute value of pes(i,p) can be used as the representative value. A representative value s2 by using an absolute value can be determined by equation (2):

$$s2 = \int_{t=0}^{mT_s} |pes(i, p)| dt \quad (2)$$
$$= \sum_{i=1}^{m} |pes(i, p)|$$

where Ts denotes a sampling interval. Equation (2) can be similarly used to calculate the representative value for the sampling values of the VCM current.

In the contact detection method according to the present embodiment, in order to significantly vary the representative values determined by equation (1) or (2) at touchdown, the heater power is reduced periodically at each step of increased heater power supplied to the heater 22d.

Specifically, at the step when the amount of electric current supplied to the heater 22d is p, after the heater power p is supplied to the heater 22d for a predetermined period, a heater power p2 that is less than the heater power p is supplied to the heater 22d for a predetermined period, and then followed by a supply of the heater power p for a predetermined period. The operations of alternately switching between the heater powers p and p2 are repeated at each step of increased heater power supplied to the heater 22d.

As shown in FIG. 5A, the variations in the position error signal and the VCM current gradually go on converging even if they increase after a delay after touchdown. However, if the heater power is reduced periodically at each step of increased heater power, when the heater power reaches the level so as to cause a touchdown, every time the heater power switches from p2 to p, touchdown occurs, causing the position error signal and the VCM current to vary significantly, and producing a large representative value.

Periodically reducing the heater power at each step of increased heater power also reduces the duration for which touchdown occurs, thus reducing the risk of potential damage to either the magnetic head 22 or the magnetic disk 15 or both due to touchdown.

Figure 5B:
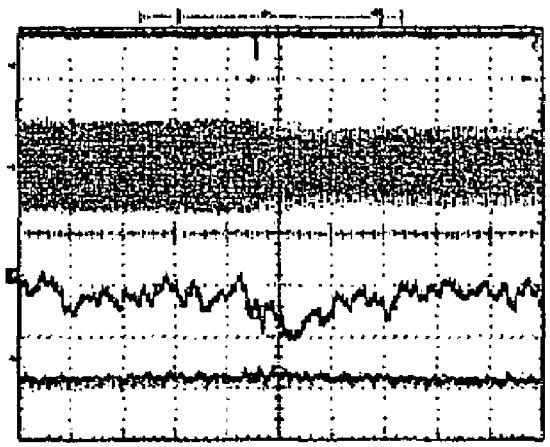
FIG. 5B is a schematic for explaining detection of external force at take-off.

The variations in the position error signal and the VCM current become significant not only at touchdown but also at take-off, that is, when the magnetic head 22 lifts from the surface of the magnetic disk 15. Specifically, the external force acting on the magnetic head 22 due to touchdown no longer acts on the magnetic head 22 when the magnetic head 22 lifts off from the magnetic disk 15. Consequently, the magnetic head 22 moves in the opposite direction due to counteraction, producing variations in the position error signal and the VCM current as shown in FIG. 5B.

Thus, if the heater power is reduced periodically at each step of increased heater power, when the heater power reaches the level so as to cause a touchdown, every time the heater power switches from p to p2, the magnetic head 22 lifts off from the magnetic disk 15, producing significant variations in the position error signal and the VCM current, thus producing a large representative value.

To make detection of touchdown easier, more weight can be given to the sampling values during a predetermined period after the heater power changes from p to p2, and from p2 to p as the variations in the position error signal and the VCM current become significant at touchdown and also at take-off.

In these predetermined periods following the change of heater power from p to p2 and from p2 to p, the position error signal and the VCM current vary significantly when the heater power reaches the level so as to cause a touchdown, it can be ascertained whether the heater power has reached the touchdown level by assigning large weights to these sampling values. Specifically, the representative value can be obtained by replacing equations (1) and (2) with equations (3) and (4), respectively, given below.

$$s3 = \sum_{i=1}^{m} \{pes(i, p) \cdot w(i) - \mu(p)\}^2 \quad (3)$$

$$s4 = \sum_{i=1}^{m} |pes(i, p) \cdot w(i)| \quad (4)$$

where w(i) is greater than one when i is the sampling period of the ith position error signal sampled during the predetermined period after the current value changes from p2 to p or during the predetermined period after the current value changes from p to p2. In all other cases w(i) is one.

Figure 6:
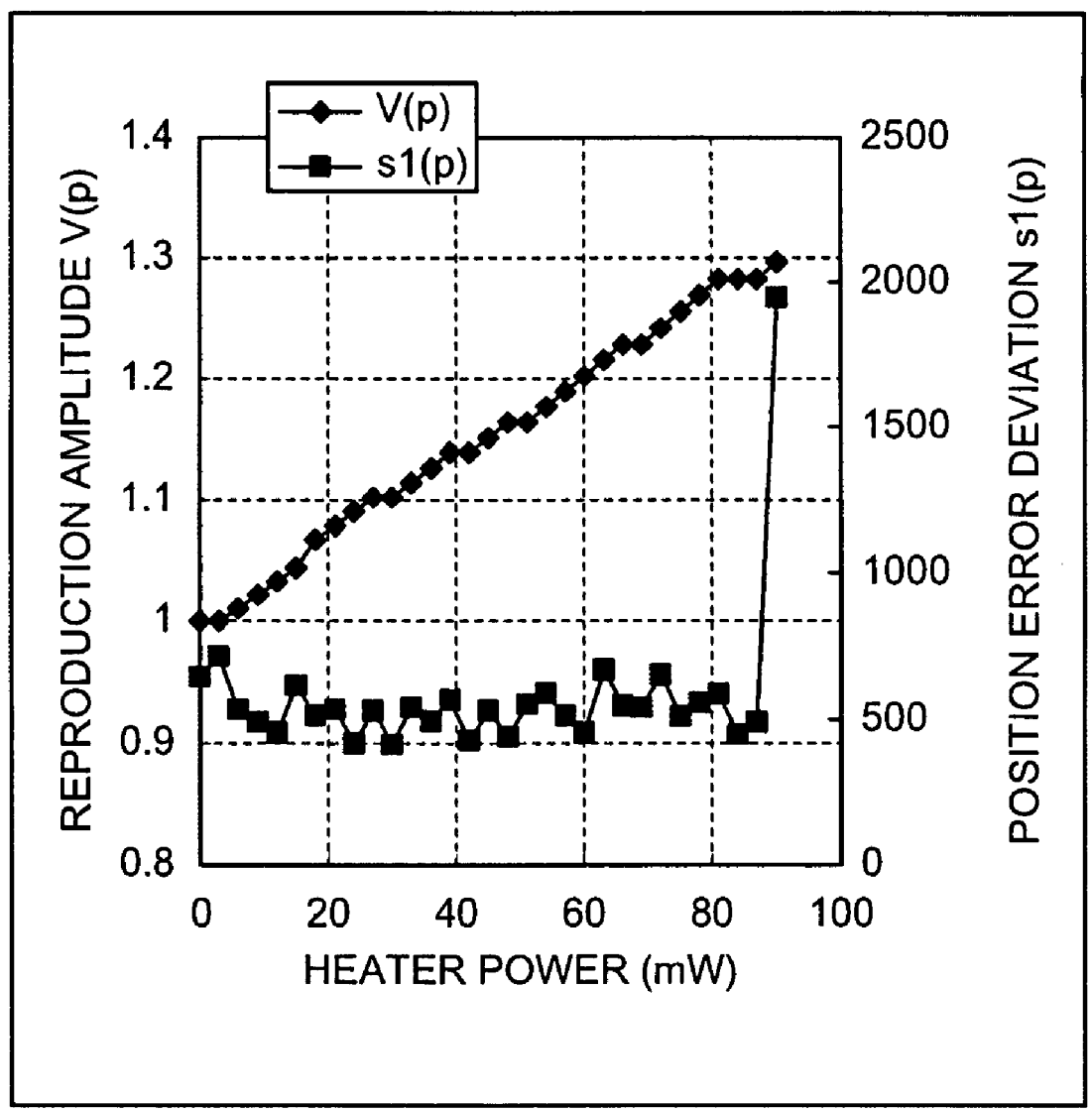
FIG. 6 is a drawing of a measurement result of reproduction amplitude and position error signal.

FIG. 6 is a graph obtained when the representative value of the sampling values at each step of increased heater power supplied to the heater 22d is calculated by using equation (1). In this example, at the step when the heater power is 90 mW, there is a steep increase in representative value s1, indicating that touchdown has occurred at this step.

Figure 4B:
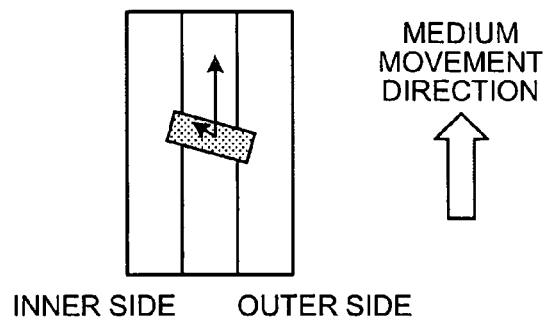
FIG. 4B is a schematic for explaining the external force produced when touchdown occurs when the yaw angle is negative.

The magnitude of the external force exerted on the magnetic head 22 at touchdown varies according to the yaw angle. Specifically, the magnitude of the external force exerted on the magnetic head 22 increases by the extent of the yaw angle. FIGS. 4A and 4B are schematics of the external force acting on the magnetic head 22 during touchdown when the yaw angle is positive and negative, respectively. In the examples shown in FIGS. 4A and 4B, the magnitude of the external force is the same though the directions are different.

Figure 4C:
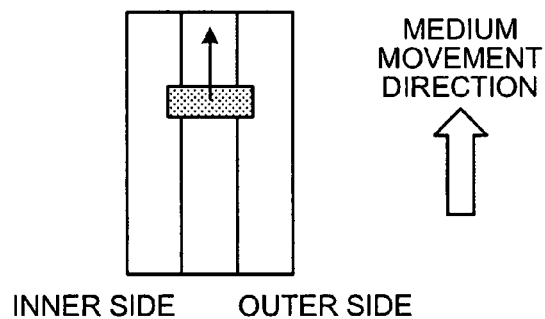
FIG. 4C is a schematic for explaining the external force produced when touchdown occurs when the yaw angle is zero.

FIG. 4C is a schematic of the external force acting on the magnetic head 22 during touchdown when the yaw angle is zero. In this case, the magnetic head 22 neither shifts towards the inner side nor towards the outer side, and no external force is exerted on the magnetic head 22 in the movable direction of the arm 17.

Thus, the external force exerted on the magnetic head 22 in the movable direction of the arm 17 increases by the extent of the yaw angle, and regardless of whether the yaw angle is positive or negative. Accordingly, the threshold value to which the representative value determined by equations (1) to (4) is compared for detecting touchdown should preferably be proportional to the absolute value of the yaw angle.

A configuration of the magnetic disk device 1 according to the embodiment is described below. Alongside obtaining the heater power supplied to the heater 22d at touchdown by the contact detecting method described above, the magnetic disk device 1 records the correlation between the heater power supplied to the heater 22d and the reproduction amplitude of the signal read by the magnetic head 22.

It is a known fact that, as shown in FIG. 6, the reproduction amplitude of the signal increases with the increase in the heater power. In other words, the reproduction amplitude of the signal increases as the magnetic head 22 gets closer to the magnetic disk 15. The correlation between the reproduction amplitude and the head-disk distance can be calculated using Wallace space loss equation. Thus, by recording the correlation between the heater power and the reproduction amplitude, the heater power required to obtain a desired distance between the magnetic head 22 and the magnetic disk 15 can be determined.

Figure 7:
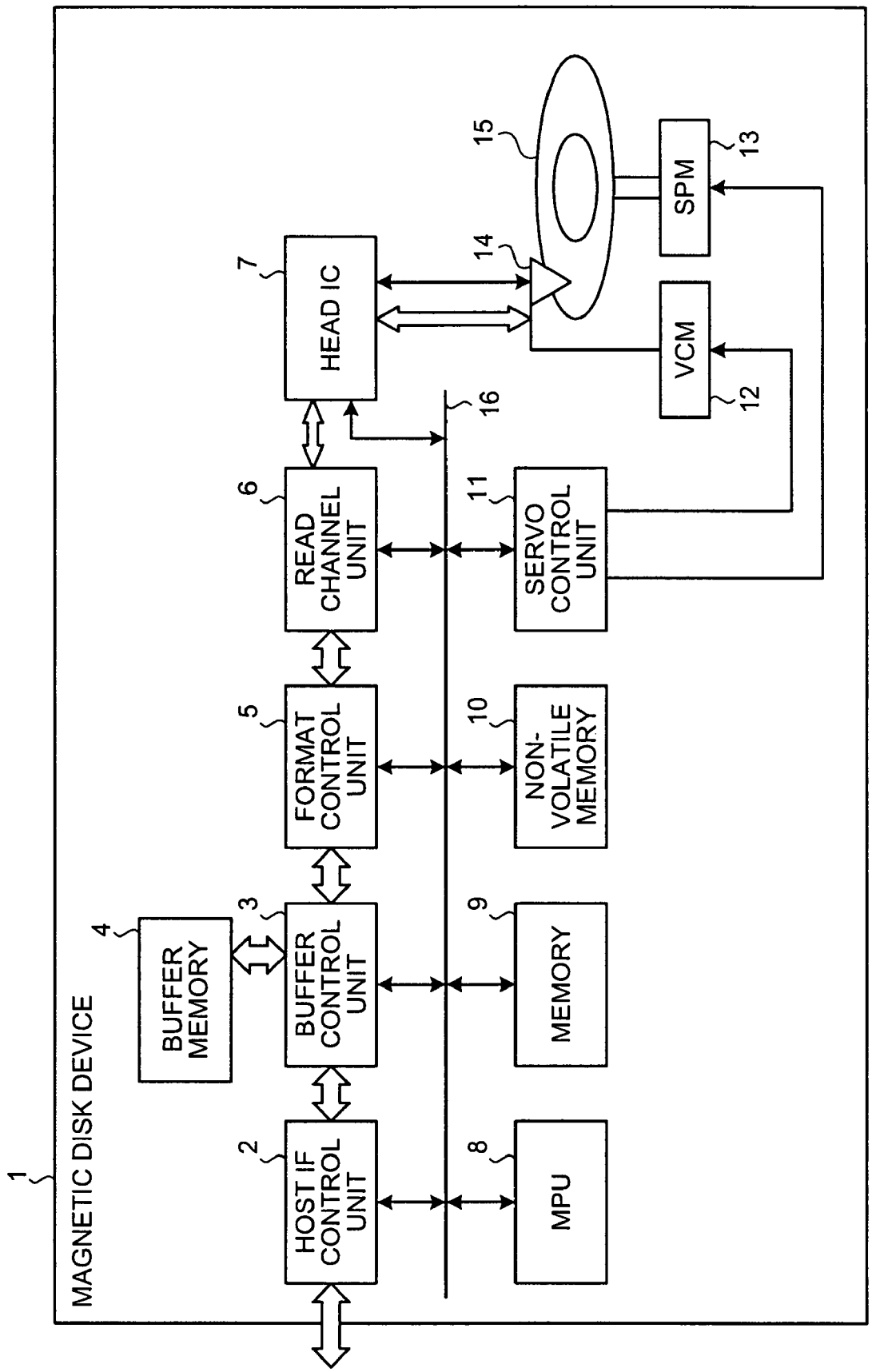
FIG. 7 is a block diagram of the magnetic disk device according to the embodiment.

FIG. 7 is a block diagram of the magnetic disk device 1 according to the embodiment. The magnetic disk device 1 includes a host interface control unit (hereinafter, "host IF control unit") 2, a buffer control unit 3, a buffer memory 4, a format control unit 5, a read channel unit 6, a head IC 7, a micro processing unit (MPU) 8, a memory 9, a non-volatile memory 10, the servo control unit 11, the VCM 12, the SPM 13, the head 14, the magnetic disk 15, and a common bus 16.

The host IF control unit 2 is connected to a host, which is a higher-level device than the magnetic disk device 1, and controls communication between the magnetic disk device 1 and the host. The buffer control unit 3 controls the buffer memory 4. The buffer memory 4 temporarily stores data to be exchanged between the host and the magnetic disk device 1.

The format control unit 5 controls data reading, and performs error-checking, etc. of the data read by the head 14. The read channel unit 6 amplifies data signal output from the head IC 7 during data reading, and performs predetermined processes such as AD conversion and demodulation. The head IC 7 includes a preamplifier (not shown), and preamplifies the data signal read by the head 14 during data reading.

The MPU 8 performs the basic control of the magnetic disk device 1 by a predetermined control program (firmware program). In other words, the MPU 8 deciphers a command from the host and controls various processing units to exert overall control over reading data from and writing data to the magnetic disk 15. In the present embodiment, the MPU 8 performs calibration for adjusting the distance between the magnetic head 22 provided at the tip of the head 14 and the magnetic disk 15.

The memory 9 and the non-volatile memory 10 store therein the firmware executed by the MPU 8 and other data required for performing control operations by the MPU 8. The servo control unit 11 monitors and drives the VCM 12 and the SPM 13.

The common bus 16 interconnects all the processing units of the magnetic disk device 1 and employs the data communication or exchange among the processing units. The descriptions of the servo control unit 11, the VCM 12, the SPM 13, the head 14, and the magnetic disk 15 have been given in the earlier section and hence not repeated here.

Figure 8:
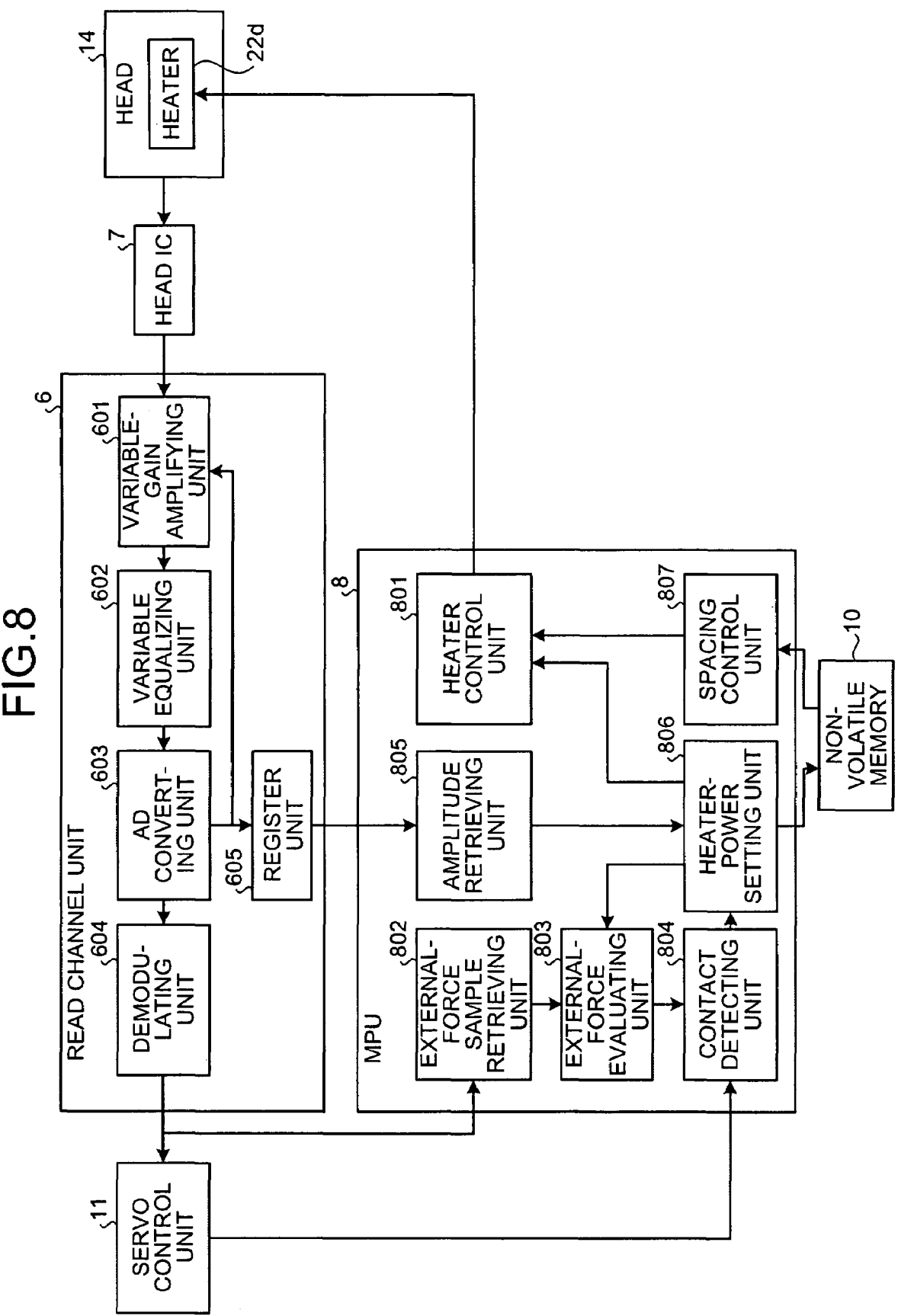
FIG. 8 is a block diagram of relevant parts of the magnetic disk device according to the embodiment.

FIG. 8 is a block diagram of the relevant parts of the magnetic disk device 1 according to the embodiment. The read channel unit 6 includes a variable-gain amplifying unit 601, a variable equalizing unit 602, an AD converting unit 603, a demodulating unit 604, and a register unit 605.

The variable-gain amplifying unit 601 sets a gain of a variable gain amplifier according to feedback gain signal received from the AD converting unit 603, and amplifies the data signal output from the head IC 7 at the set gain. The variable-gain amplifying unit 601 sets a gain so that the level of the data signal after amplification is uniform. In other words, the variable-gain amplifying unit 601 constitutes an automatic gain control (AGC) loop along with the variable equalizing unit 602 and the AD converting unit 603.

The variable equalizing unit 602 adjusts the frequency characteristics of the data signal amplified by the variable-gain amplifying unit 601, and outputs the adjusted data signal to the AD converting unit 603.

The AD converting unit 603 converts the data signal received from the variable equalizing unit 602 into digital data signal, and outputs the digital data signal to the demodulating unit 604. The AD converting unit 603 also generates the feedback gain signal based on the data signal output by the variable equalizing unit 602 for controlling the gain of the variable-gain amplifying unit 601, and outputs the feedback gain signal to the variable equalizing unit 602 and the register unit 605.

The demodulating unit 604 demodulates the digital data signal obtained after AD conversion, and outputs the demodulated signal to the format control unit 5 that checks data for errors. The demodulating unit 604 demodulates the positioning data read from the servo area, and outputs the demodulated positioning data as position error signal to the servo control unit 11.

The register unit 605 temporarily stores therein the gain signal output from the AD converting unit 603 and feeds the gain signal to the MPU 8. The gain signal held by the register unit 605 is used for amplifying the data signal input into the variable-gain amplifying unit 601 to a uniform level. The gain gets larger as the level of signal read by the head 14 gets smaller, and vice versa. Thus, the reproduction amplitude of the data signal read by the head 14 can be obtained from the gain signal stored in the register unit 605.

As shown in FIG. 8, the MPU 8 includes a heater control unit 801, an external-force sample retrieving unit 802, an external-force evaluating unit 803, a contact detecting unit 804, an amplitude retrieving unit 805, a heater power setting unit 806, and a spacing control unit 807.

The heater control unit 801 controls the heater power supplied to be added to the heater 22d that is built into the head 14. Specifically, during calibration, the heater control unit 801 increases the heater power stepwise while allowing for a time period for periodic reduction of the heater power at each step of increased heater power, according to the instruction from the heater power setting unit 806. Under normal operation, the heater control unit 801 applies the heater power specified by the spacing control unit 807 to the heater 22d.

The external-force sample retrieving unit 802 retrieves sampling values of the position error signal output to the servo control unit 11 by the demodulating unit 604 at predetermined sampling intervals. To perform complete sampling without missing the variations in the position error signal due to variations in the heater power, the sampling intervals should be shorter than at least the interval specified for varying the heater power by the heater power setting unit 806 to the heater control unit 801 during calibration.

The external-force sample retrieving unit 802 can be configured to retrieve sampling values of the VCM current output by the servo control unit 11 to the VCM 12 for correcting the radial position of the magnetic head 22 instead of the position error signal.

The external-force evaluating unit 803 temporarily stores the sampling values obtained by the external-force sample retrieving unit 802, and calculates their representative value using any of the equations (1) to (4). The timing when the external-force evaluating unit 803 retrieves sampling values of the representative values is specified by the heater power setting unit 806 in such a way that the representative values are retrieved when the heat amount is at one of the steps.

The contact detecting unit 804 retrieves the radial position of the magnetic head 22 from the servo control unit 11, compares the threshold value corresponding to the radial position and the representative value calculated by the external-force evaluating unit 803, determines whether touchdown has occurred, and outputs the determination result to the heater power setting unit 806.

The heater power setting unit 806 performs overall control of calibration. How calibration is done is described later. The heater power setting unit 806 determines the heater power required to set the distance between the magnetic head 22 and the magnetic disk 15 to a desired value based on the data obtained in the calibration process, and stores the heater power in the non-volatile memory 10.

Figure 9:
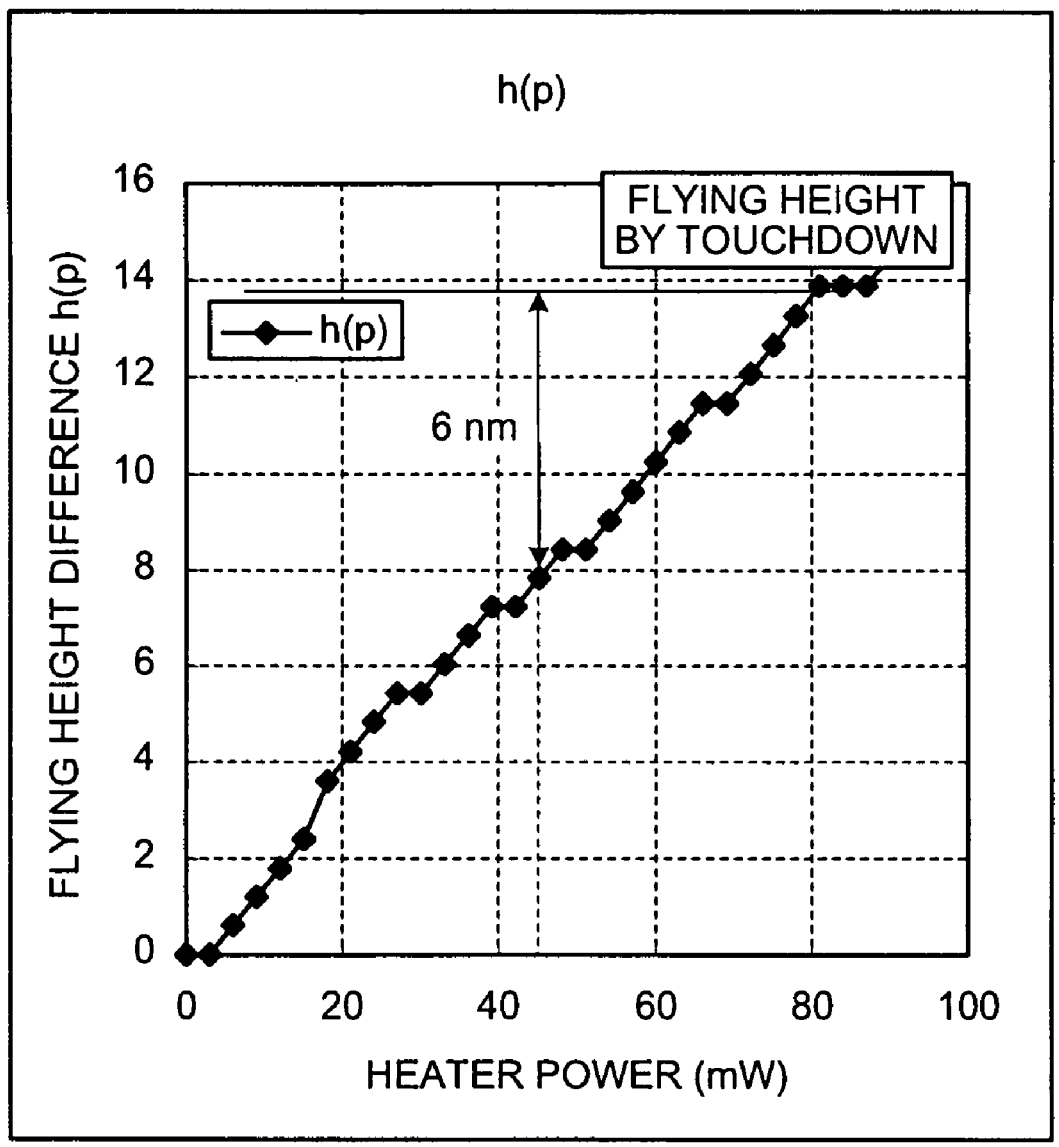
FIG. 9 is a drawing of setting of heater power performed by a heater power setting unit.

FIG. 9 is a graph showing the spacing set by the heater power setting unit 806. It is shown in the example that by performing calibration, touchdown occurs when the heater power reaches about 80 mW and that the distance between the magnetic head 22 and the magnetic disk 15 shrinks by about 14 nm in the period when the heater power is raised from 0 up to touchdown level. In other words, the example indicates that the distance between the magnetic head 22 and the magnetic disk 15 is about 14 nm when the heater power is 0.

The heater power for each step extending to 80 mW can be obtained. Also the distances between the magnetic head 22 and the magnetic disk 15 in all the intervening steps can be obtained. Hence, from this data it can be easily determined that the heater power required to obtain a desired distance of say 6 nm between the magnetic head 22 and the magnetic disk 15 during normal operation would be about 45 mW as shown in FIG. 9.

The distance between the magnetic head 22 and the magnetic disk 15 is also affected by various factors such as the radial position of the magnetic head 22 and temperature. Therefore, calibration should preferably be done by taking each of these conditions into consideration, and the heater power should be stored in the non-volatile memory 10 associated with the respective condition the spacing control unit 807 reads the heater power from the non-volatile memory 10 and applies the heater power to the heater 22d during normal operation. If the heater power stored in the non-volatile memory 10 is associated with a condition, the spacing control unit 807 selects the heater power suitable to the prevailing condition, and applies the selected heater power to the heater 22d. If a corresponding radial position data is not available, the spacing control unit 807 can perform linear interpolation of the heater powers corresponding to another condition to obtain a heater power suited to the prevailing condition.

Figure 10:
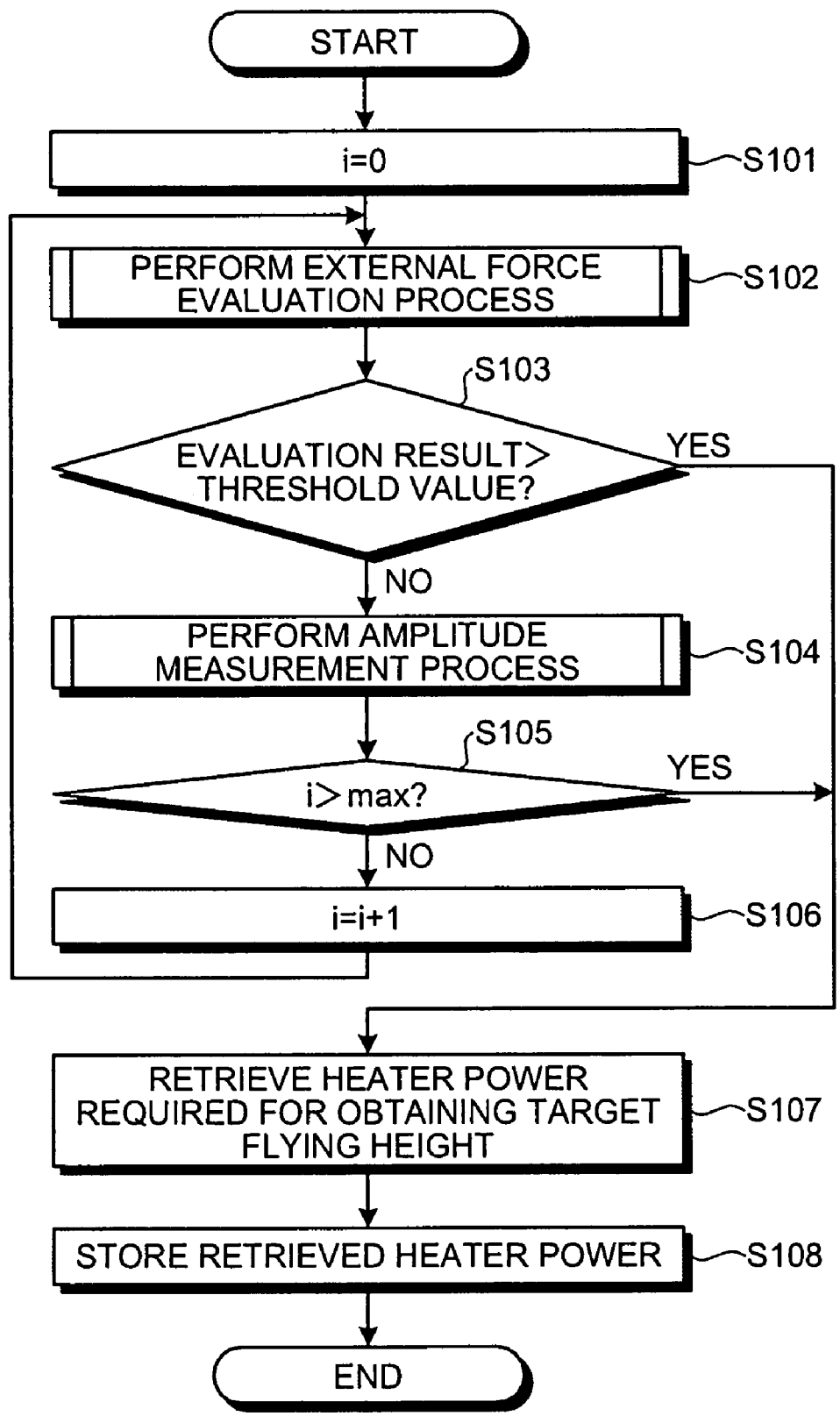
FIG. 10 is a flowchart of a process procedure of the magnetic disk device according to the embodiment.

A process procedure of the magnetic disk device 1 according to the embodiment is described below. FIG. 10 is a flowchart of the process procedure of the magnetic disk device 1 according to the embodiment, and is of the calibration process.

In this process, the heater power setting unit 806 assigns the value 0 to the variable i (step S101). The variable i represents the step at which the heater power is to be increased.

Next, the heater power setting unit 806 performs an external force evaluation process described later to determine the representative value of the sampling values obtained at that step (step S102). If the contact detecting unit 804 determines that the representative value is less than or equal to the threshold value, in other words, touchdown has not occurred at that step (No at step S103), the heater power setting unit 806 performs an amplitude measurement process described later to determine the reproduction magnitude at that step, and stores the reproduction magnitude associated with the step (step S104).

If the variable i is less than a maximum value max (No at step S105), the heater power setting unit 806 increments the variable i by one (step S106), and repeats all the steps from step S102. The maximum value max has to be such that it does not cause plastic deformation of the element.

If the contact detecting unit 804 determines that the representative value is greater than the threshold value, that is, if the contact detecting unit 804 determines that touchdown has occurred (Yes at step S103), or if the variable i crosses the maximum value max (Yes at step S105), the heater power setting unit 806 determines the heater power required to set the desired distance between the magnetic head 22 and the magnetic disk 15 based on the data obtained up to that point (step S107), and stores the determined heater power in the non-volatile memory 10, thereby ending the process (step S108).

Step S107 is described below in detail. In the process procedure described above, the reproduction amplitude is not measured at the step at which touchdown occurs. Therefore, a spacing variation fh that indicates the amount of extension of the magnetic head at the step just before the touchdown step is determined by Wallace equation (5):

$$fh = \frac{\lambda}{2\pi}\log\{V(ptd - \Delta p) - V(0)\} \quad (5)$$

where ptd represents the heater power at the touchdown step, $\Delta p$ represents the difference in the heater power between two successive steps, $V(ptd-\Delta p)$ represents the reproduction amplitude calculated at the step just before the touchdown step, and V(0) is the reproduction amplitude measured when the heater power is zero.

Similarly, a spacing variation h(p) at the step just before the touchdown step is determined by equation (6):

$$h(p) = \frac{\lambda}{2\pi}\log\{V(p) - V(0)\} \quad (6)$$

where h(p) represents the spacing variation at the step when the heater power is p and V(p) is the reproduction amplitude measured at the step when the heater power is p.

A distance sp between the magnetic head 22 and the magnetic disk 15 during normal operation is determined by equation (7):

$$sp = fh - h(p) \quad (7)$$
$$= \frac{\lambda}{2\pi}\log\{V(ptd - \Delta p) - V(p)\}$$

Equation 8 given below is obtained if V(p) is determined by equation (7) to set the distance sp to the desired value:

$$V(p)=V(ptd-\Delta p)-\exp(2\pi \cdot sp/\lambda) \quad (8)$$

The heater power p corresponding to the reproduction amplitude V(p) can be determined by approximation based on the stored sets of heater power and its corresponding reproduction amplitude at each step of increased heater power.

FIG. 11 is a flowchart of the external force evaluation process. In this process, the heater power setting unit 806 instructs the external-force sample retrieving unit 802 to start retrieving sampling values as well as instructing the external-force evaluating unit 803 to start storing the sampling values retrieved by the external-force sample retrieving unit 802 (step S201), and assigns the value 0 to the variable j (step S202).

The heater power setting unit 806 instructs the heater control unit 801 to set the heater power supplied to the heater 22d as a value obtained by multiplying $\Delta p$ with i (step S203), and hold the setting for a duration t1 (step S204). Next, the heater power setting unit 806 instructs the heater control unit 801 to set the heater power supplied to the heater 22d as p2 (step S205), and hold the setting for a duration t2 (step S206).

The heater power setting unit 806 then increments the variable j by 1 (step S207). If the variable j is less than a predetermined number of repetitions (Yes at step S208), the heater power setting unit 806 repeats all the steps from step S203 onwards.

FIG. 13 is a timechart of contact detection. The repetition of heater power variation corresponds to the variation in the heater power in the initial portion at each step of increased heater power in the timechart shown in FIG. 13. Thus, by varying the heater power stepwise, the variation in the sampling values at touchdown can be increased, enabling easy detection of touchdown and avoiding damage to either the head or the storage medium due to prolonged touchdown.

The duration t1 at steps S203 to S206 should preferably be sufficiently long enough to allow at least full thermal extension while being as short as possible to avoid damage due to touchdown.

Specifically, if the time required for full extension is tr, then t1 should satisfy t1≧tr while being as short as possible.

The duration t2, on the other hand, should be enough to enable retraction of the head to an extent so as to cause take-off so that the magnetic head 22 and the magnetic disk 15 are not in contact, and should preferably as short as possible so that extension at the next step can be faster. The heater power p2 should also preferably be a magnitude enough to enable retraction of the head to an extent so as to cause take-off. For example, the heater power p2 can be a value obtained by multiplying the value obtained multiplying $\Delta p$ by i further by a factor of 0.9.

Specifically, if the time required for retraction up to the time the current supply is stopped is tf, then t2 should satisfy t2≦tf.

If the variable j is greater than the number of repetitions (No at step S208), the heater power setting unit 806, instructs the heater control unit 801 to set the heater power supplied to the heater 22d as zero (step S209).

The heater power setting unit 806 then instructs the external-force sample retrieving unit 802 to stop retrieving sampling values (step S210) and the external-force evaluating unit 803 to calculate the representative value of the variance of the sampling values (step S211).

FIG. 12 is a flowchart of the amplitude measurement process. In this process, the heater power setting unit 806 instructs the heater control unit 801 to set the heater power supplied to the heater 22d as a value obtained by multiplying Δp with i (step S301).

The heater power setting unit 806 then retrieves the reproduction amplitude output by the amplitude retrieving unit 805 at the prevailing heater power and stores the reproduction amplitude associated with the prevailing heater power (step S302). Next, the heater power setting unit 806 instructs the heater control unit 801 to set the heater power supplied to the heater 22d as zero (step S303).

In the timechart shown in FIG. 13, the amplitude measurement process corresponds to the portion where the heater power is a uniform level at the latter half of each step of increased heater power. If touchdown is detected (at step Pn) when the amplitude measurement process is underway, amplitude measurement is not carried out. Therefore, by not measuring the amplitude at touchdown, the contact duration can be shortened, avoiding the possibility of damage due to touchdown.

Thus, in the embodiment, sampling values of the magnitude of the external force exerted in the movable direction of the arm are retrieved at each step of increased heater power supplied to the heater. The representative value of the sampling values for each step is calculated. Whether the head has come in contact with the storage medium is determined based on the representative value. Consequently, the variation of the external force acting on the head due to the head-storage medium contact can be accurately detected.

The calibration process described in the embodiment can be implemented in the magnetic disk device by a computer program that is installed from a medium, device, or another computer and executed by the MPU 8. Instead of the MPU 8, a central processing unit (CPU) or a micro controller unit (MCU) of the magnetic disk device 1 can execute the computer program.

The calibration function of the embodiment can also be implemented by hardware in the form of a head control device. The present invention is applicable to perpendicular magnetic recording heads as to in-plane magnetic recording heads.

According to an embodiment of the present invention, sampling values of a magnitude of an external force exerted in a movable direction of a head supporting mechanism that supports a head are retrieved and then a representative value of the sampling values is calculated for every step of increased heater power supplied to a heater. Whether contact has occurred between the head and a storage medium is determined based on the calculated representative value. Consequently, the variation in the external force produced by the contact between the head and storage medium can be accurately detected.

According to an embodiment of the present invention, at every step of increased heater power to the heater, provision is made for a period of reduced heater power. Consequently, at each step of increased heater power, the duration for which the head and the storage medium are in contact is shortened, reducing the possibility of damage to either the head or the storage medium or both. Further, the number of defective products can be minimized during production. Accurate and efficient spacing measurement improves recording and reproduction efficiency, making it possible to make the storage medium further high-density.

Anything to which the constituent elements of the present invention, method, device, system, computer program, storage medium, data structure, etc. can be applied is considered as embodying an aspect of the present invention.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A head control device for controlling, through thermal expansion of a heater, a position of a head for reading and writing data from and to a storage medium, the head control device comprising:
   a heater control unit that increases a current supplied to the heater stepwise;
   an external-force sample retrieving unit that retrieves sampling values of signals each indicating a magnitude of an external force acting on the head in a moving direction of a head support mechanism of the head, the moving direction being in a direction parallel to the storage medium;
   an external-force evaluating unit that calculates a representative value of the sampling values retrieved by the external-force sample retrieving unit to evaluate the magnitude of the external force every time the heater control unit increases the current; and
   a contact detecting unit that detects contact between the head and the storage medium by comparing each evaluation result by the external-force evaluating unit with a predetermined threshold value,
   wherein the contact detecting unit varies the threshold value according to an absolute value of a yaw angle between a tangent to a target track on the storage medium and the head support mechanism.

2. The head control device according to claim 1, wherein the external-force evaluating unit calculates a variance of the sampling values retrieved by the external-force sample retrieving unit, as the representative value.

3. The head control device according to claim 1, wherein the external-force evaluating unit calculates an integrated absolute value of the sampling values retrieved by the external-force sample retrieving unit, as the representative value.

4. The head control device according to claim 1, wherein the external-force sample retrieving unit retrieves sampling values of position error signal each indicating an offset from a target track on the storage medium, the position error signal indicating the magnitude of the external force.

5. The head control device according to claim 1, wherein the external-force evaluating unit retrieves sampling values of driving currents of a driving mechanism that actuates the head support mechanism to follow a target track on the storage medium, the driving currents indicating the magnitude of the external force.

6. The head control device according to claim 1, wherein when increasing the current, the heater control unit allows for at least one duration in which the current is reduced while holding an upper limit of the current steady.

7. The head control device according to claim 6, wherein the external-force evaluating unit evaluates the magnitude of the external force by assigning weight to the sampling values obtained by the external-force sample retrieving unit during a predetermined time period after the current reaches the upper limit as well as during a predetermined time period from a starting time of the duration.

8. The head control device according to claim 6, wherein when increasing the current, the heater control unit sets a duration in which the current is the upper limit to be longer than a duration required for the head to be fully thermally expanded.

9. A storage device for reading and writing data from and to a storage medium, the storage device comprising:
- a heater that changes a position of a head for reading and writing data from and to the storage medium by thermal expansion;
- a heater control unit that increases a current supplied to the heater stepwise;
- an external-force sample retrieving unit that retrieves sampling values of signals indicating a magnitude of an external force acting on the head in a moving direction of a head support mechanism of the head, the moving direction being in a direction parallel to the storage medium;
- an external-force evaluating unit that calculates a representative value of the sampling values retrieved by the external-force sample retrieving unit to evaluate the magnitude of the external force every time the heater control unit increases the current;
- a contact detecting unit that detects contact between the head and the storage medium by comparing each evaluation result by the external-force evaluating unit with a predetermined threshold value; and
- a spacing control unit that controls the head to maintain a constant distance between the head and the storage medium based on the current at detection of the contact by the contact detecting unit,
- wherein the contact detecting unit varies the threshold value according to an absolute value of a yaw angle between a tangent to a target track on the storage medium and the head support mechanism.

10. A contact detection method for detecting contact between a head and a storage medium, the head being used for reading and writing data from and to the storage medium, a position of the head being changed by thermal expansion of a heater, the head and the heater being included in a storage device, the contact detection method comprising:
- increasing a current supplied to the heater stepwise;
- retrieving sampling values of signals each indicating a magnitude of an external force acting on the head in a moving direction of a head support mechanism of the head, the moving direction being in a direction parallel to the storage medium;
- calculating a representative value of the sampling values to evaluate the magnitude of the external force every time the current is increased; and
- detecting contact between the head and the storage medium by comparing each evaluation result of the magnitude of the external force with a predetermined threshold value,
- wherein the detecting includes varying the threshold value according to an absolute value of a yaw angle between a tangent to a target track on the storage medium and the head support mechanism.

* * * * *